United States Patent

Barbarich et al.

Patent Number: 5,163,600
Date of Patent: Nov. 17, 1992

[54] FINGERTIP SOLDERING TOOL

[76] Inventors: Steve Barbarich, 3862 Mission Ave., Carmichael, Calif. 95608; Cary W. Chleborad, 4024 Triplett Ct., Carmichael, Calif. 95608-6628; James Fiechtner; Floyd Fiechtner, both of 5930 Dollar La., Carmichael, Calif. 95608-0127

[21] Appl. No.: 821,679

[22] Filed: Jan. 17, 1992

[51] Int. Cl.⁵ .............................................. B23K 3/03
[52] U.S. Cl. ..................................... 228/51; 219/229; 219/237; 228/57; D8/30
[58] Field of Search ............... 219/221, 229, 230, 233, 219/236, 237, 238, 239, 240, 241; 228/51, 57; D8/30

[56] References Cited

U.S. PATENT DOCUMENTS

| | | | |
|---|---|---|---|
| 3,398,874 | 8/1968 | Sauer | 228/57 |
| 3,691,342 | 9/1972 | Giles | 219/229 X |
| 3,851,145 | 11/1974 | Fukanaga | 219/236 |
| 3,876,857 | 4/1975 | Dhillon | 219/230 |
| 3,881,087 | 4/1975 | Nicosia | 219/233 |
| 3,899,654 | 9/1975 | Walton | 219/229 |
| 4,086,465 | 4/1978 | Sylvester | 219/236 |
| 4,765,116 | 8/1988 | Shank | 52/747 |
| 4,785,793 | 11/1988 | Oglesby | 226/414 |
| 4,940,178 | 7/1990 | Hombrecher | 228/57 X |
| 4,984,655 | 10/1990 | Wahl | 219/233 |
| 5,025,973 | 6/1991 | Newton | 228/55 |

Primary Examiner—Kenneth J. Ramsey

[57] ABSTRACT

A fingertip soldering tool has been designed which is made up of a small fingertip soldering body that is secured above the human finger (preferably the index finger) via a finger strap. Within the fingertip soldering body is a soldering tip for electrical and electronic soldering. The present fingertip soldering tool has essential advantages: a) The same hand which the soldering tool is attached to is freed up for other use; and (b) the small soldering tip provides electrical efficiency, allows wide access into small areas and gives rise to structural lightness which enhances its maneuverability further. A protective shield around the soldering tip provides safety from the surrounding environment and human flesh.

11 Claims, 2 Drawing Sheets

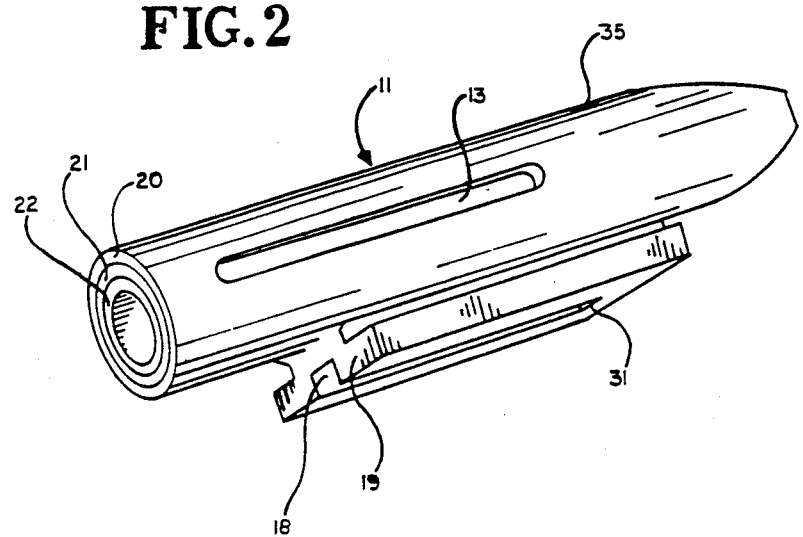
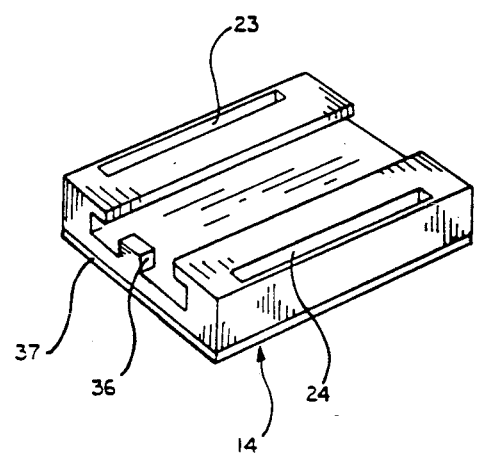
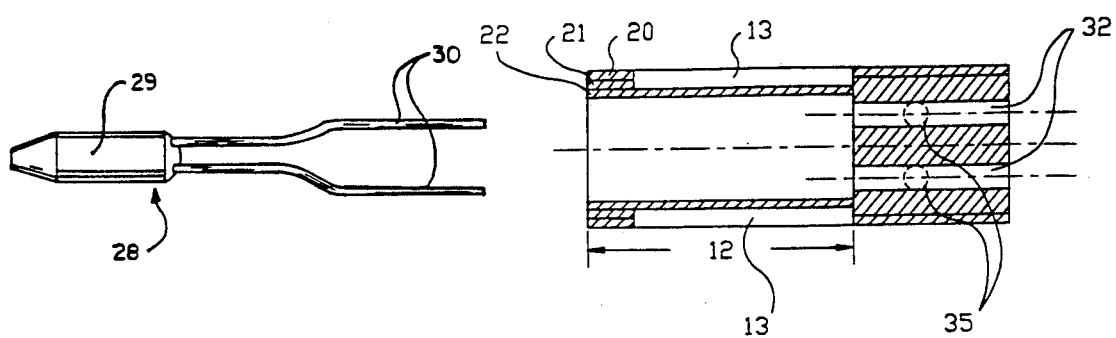

FINGERTIP SOLDERING TOOL

BACKGROUND

1. Field of Invention

The present invention relates to a soldering tool, in particular a fingertip soldering tool.

2. Discussion of Prior Art

Soldering tools in prior art suffer from a number of disadvantages:

a) It is known in essentially all prior art as far as the author knows that soldering tools & irons have handles which must be held by one hand at all times when soldering. Some references, just to name a few are Weller U.S. Pat. Nos. 3,264,449 & 3,410,472, Nockunas U.S. Pat. No. 2,558,192, Anton U.S. Pat. No. 2,724,041, Smith U.S. Pat. No. 2,973,422, Giles & Madden U.S. Pat. No. 2,558,192, Walton U.S. Pat. No. 3,899,654, Ogelsby U.S. Pat. No. 4,785,793, and Hombrecher U.S. Pat. No. 4,940,178. Having a handle on a soldering tool or iron gives rise to the classical problem of not being able to hold the wires, solder, and/or piece of interest in that same hand while trying to solder. There is only one other hand to hold such items. This problem is frustrating and is an awkwardness that has existed in soldering tools since they were first conceived. In an effort to satisfy this dire need, such inventions such as a wire clamp called the Panavice, U.S. Pat. No. 3,661,776, which allows you to clamp the wires into certain positions via adjustable clamps while the user solders, but it is time consuming to position such wires in the clamps and expensive to buy accessories every time one purchases a soldering iron. Many hobbyists and technicians often find themselves either mounting their piece or wires of interest into a vice-clamp to reduce the awkwardness of not being able to hold all the different elements involved in the soldering process. This process of vice-clamping in itself is awkward, time consuming, and many times incompatible with the work, leaving open the need for a better soldering tool design.

b) Since essentially all soldering irons have handles of some form for the hand, it takes some skill and patience to control where the actual tip of the soldering iron is going to touch. The handles on must soldering irons, such as the ones already mentioned in the referenced patents, require that the handle is built a certain distance away from the actual soldering tip usually because the heat from the tip needs ample distance to dissipate before it is felt by the human hand on the handle portion of the tool. This heat must be dissipated, but to also preserve precision and efficiency during soldering, Keeping the distance short (<2") from the tip of the iron to the hand is crucial. Perhaps a good analogy is with a writing utensil. In order to get ample precision and speed in writing, the finger tips of the hand must be very close to where the actual lead hits the paper. Holding the hand away from the tip gives rise to an unbalanced, "wobbly" effect.

c) Most Prior art soldering irons such as Sylvester U.S. Pat. No. 4,086,465 or Hambrecher U.S. Pat. No. 4,940,178, are grossly inefficient electrically due mainly to the heat conduction away from the soldering tip through the means that energize the internal heating element and support the actual tip. One soldering tool in particular by Walton U.S. Pat. No. 3,899,654 (cited earlier) has a more electrically efficient solution for a heating element, but this iron doesn't solve the problems mentioned in a), b), d) & e).

d) Due to the rather large size of most heating elements in soldering tools, especially in the cases of soldering guns such as Nicosia U.S. Pat. No. 3,881,087 and Anton U.S. Pat. No. 2,724,041 (already cited), these tools cannot fit into very small places. In an exponentially component shrinking hi-tech world, fitting into small places is a necessity. In most prior art, soldering tools and irons have large tubular constructions. These tubular diameters are usually too large to allow insertion into constricted locations. The large sizes of irons also adds up to a lot of material expenses. Lastly, the larger irons reduce your market size as a product. Larger irons most likely cannot reach potential hi-tech surface mount assembly customers which need smaller soldering tools. A smaller iron can capture all markets from the hobbyist to the surface mounters if inexpensive to manufacturer.

e) Almost all prior art with tubular heating cores leave a larger portion of their hot (>300 F) tubular member exposed to the surroundings. This can be unsafe for obvious reasons. It would be an advantage to reduce the amount of hot surface area exposed to the environment.

II Objects and Advantages of the Invention

In parallelism with the a), b), c), d), e) categories of the prior section, the objects and advantages of the present invention are:

a) The first object of the fingertip soldering iron pertains to eliminating a handle by implementing a new design. The advantage is that the whole fingertip soldering tool is above the finger on one of the fingers of a the hand. This frees up that entire hand to hold wires, solder, and/or the piece of interest. This helps to eliminate the awkwardness and difficulty that has existed in prior art soldering tools. This long existing need to free up the hand will also help eliminate the need to use clamping devices and aids to set-up for the soldering of a single joint. Structural design of most prior art tubular shaped soldering tools precludes the possibility of putting such an assembly above the finger because of their rather large sizes due to large tubular members (around 1 inch diameters), long heating elements (several inches), and handles. The fingertip soldering iron, on the other hand, is the smallest and lightest soldering tool ever designed (as far as the author knows) being approximately 1-2 inches cubed in volume. The complete soldering assembly more generally consists of a special heating tip, such as the Isotip ™ manufactured by Wahlclipper, and a heat resistant structure to support and cover the tip.

b) It is another object of the invention to provide "fingertip control" and precision in soldering. Since the point of soldering contact and the actual fingertip are very close (0.5"-1.5"), the user has the advantage of natural precision that goes along with having the heating element near the fingertip. In prior art soldering tools such as long tubular irons and soldering guns, holding the soldering tool at a distance far away from the actual soldering tip gives less control and often a shaky experience which requires much practice to become skilled at. The naturalness of having the soldering at the control of a nearby fingertip (such as with a writing utensil) allows beginners to learn much more quickly and experts to solder more effortlessly and quickly. A protective cover around the tip along with different layers of heat resistant materials and a finger strap insulate the heat of the tip from the finger.

c) A high electrical efficiency is accomplished by having the entire heating element consisting of only a small soldering tip such as the one mentioned before (Isotip ™ manufactured by Wahlclipper) The Iso-tip line of tips provide many different tips for various purposes, all of which will be compatible to this design. Since many tips are already compatible with the pursuing design, we will not go further into their design except to say that it is a fact that attenuating the cross-section of the heating element, such as these tips have been designed, confines the heat generated by the element largely to where it is required. The tips have conductive prongs which go into the actual metal tip section. These conductive prongs, being only of diameter 0.034-0.04 inch, confines most of the heat generated to the metal tip section (See Walton U.S. Pat. No. 3,899,654 for details on the tip which was cited here as the Isotip ™).

d) Another object of the invention is perhaps that it is the smallest lightest soldering tool ever designed. The small assembly which holds the soldering tip allows easy and comfortable maneuverability amongst tangled wires or cluttered peripheral environments. This is in contrast to most prior art's bulky and limited scope characteristics. A cover on the present tool covering approximately one half of the tip gives way to exposure of less than 0.75" of the heating element at all times. A fingerstrap attached to the bottom of the fingertip soldering body and assembly firmly secures the finger enhancing the possibility of fitting the tool into small places. Moreover, the smallness of the present fingertip soldering iron makes it marketable to space limited and small component surface mount technicians as well as general technicians and hobbyists.

e) Another object of this invention is the safety advantage gained by exposing very little of the heating element to the surrounding environment (<0.75"). This is accomplished first, by having only a small heating tip comprising the entire heating element, and secondly, by further covering approximately half of this heating tip with layers of heat insulating materials such as ceramic, thermoplastics, and/or foams. As far as the author knows, no other soldering tool has such a small amount of "hot metal" (300 F − 800 F) exposed to the outside environment. The classical soldering iron such as Weller U.S. Pat. No. 3,188,488 have long tubular members of several inches of hot metal exposed to the environment. It has been realized by people skilled in the art, that this exposure occasionally will frightfully and accidentally burn other items around the tool such as wires, the piece, and even the human hand.

DRAWING FIGURES

FIG. 1—The complete Fingertip soldering iron with human finger attached

FIG. 2—The Cylinder of the Fingertip soldering iron serving as a protective heat shield for the iron.

FIG. 3—Sectional View of Cylinder

FIG. 4—The Base piece which allows the Cylinder's sliding adjustability and is also a structure to attach the human finger to.

REFERENCE NUMERALS IN DRAWINGS

| 11 cylinder | 33 fastening screws |
| --- | --- |
| 12 hollow tubular portion | 34 washer connectors |
| 13 heat ventilation slots | 35 screw holes |
| 14 base | 36 base safety notch |
| 15 adjustable fingerstrap | 37 foam insulation for finger |
| 16 attached end of strap | |
| 16.5 free end of strap | |
| 18 cylinder sliding groove | |
| 19 slide | |
| 20 foam insulation | |
| 21 thermoplastic layer | |
| 22 thermal insulator insert | |
| 23 right rim | |
| 24 left rim | |
| 25 male securing means | |
| 26 female securing means | |
| 27 power cord | |
| 28 tip | |
| 29 heating element of the tip | |
| 30 prongs of the tip | |
| 31 cylinder safety notch | |
| 32 prong holders | |

DETAILED DESCRIPTION OF INVENTION AND ITS EMBODIMENTS

Figure 1:
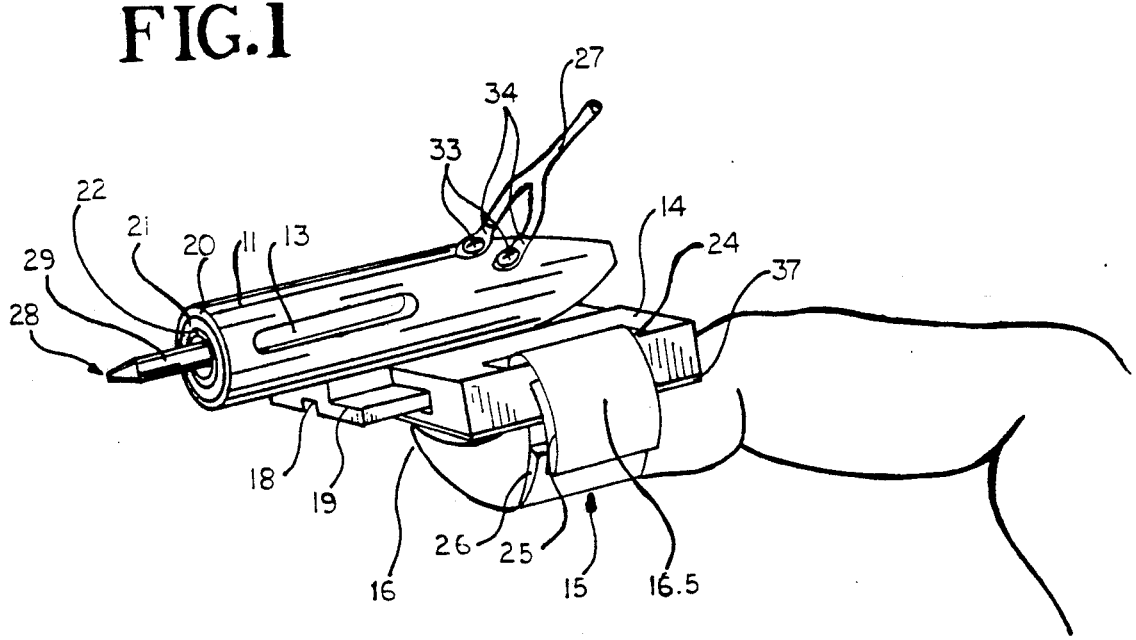

A preferred embodiment of the present invention is captured in FIG. 1. The fingertip soldering iron includes two major non-metal components: the cylinder 11 shown solely in FIG. 2 and cross-sectioned in FIG. 3, and the base 14 also represented solely in FIG. 4. A metal soldering tip 28 is then inserted into this body. A nylon adjustable fingerstrap 15 then attaches the fingertip soldering irons body securely to a human finger, preferably the index finger.

The cylinder 11 shown explicitly in FIG. 2 consists of a capsule built to surround the tip 28 once inserted. The bottom of the cylinder 11 includes a slide 19 which contains a cylinder sliding groove 18 which allows the cylinder 11 to slide forwards and backwards axially along the base 14 for adjustability. FIG. 2 shows a full view of the slide on the cylinder 19. The sliding action is a frictional sliding mechanism that allows the cylinder 11 to slide only when a certain amount of force is used to push it. This is accomplished in the design by making the cylinder sliding groove's 18 dimensions only several thousandths of an inch larger than the inside dimensions of the base 14. Note that there is a base safety notch 36 which collides with the cylinder safety notch 31 when the cylinder 11 has slid to its furthest forward extension on the base 14. This is a safety feature which prevents the cylinder 11 (which contains the 700 F-800 F tip 28) from sliding too far forward and thus falling off the base 14. The length of the cylinder 11 and base 14 are between 1"-2". The foam insulation for finger 37 is glued onto the bottom of the base 14 for insulation and comfortability for the finger. The tip 28 can be plugged into the rear of the cylinder 11 via the prongs of the tip 30. The prongs of the tip 30 are then inserted into the prong holders 32 and fastened down by screwing down the two fastening screws 33 through the screw holes 35 and against the prongs of the holder 32. The fastening screws 33 are tightened against two washer connectors 34 which are soldered directly to the power cord 27. Electrical current can then flow directly from the power cord 27 through the washer connectors 34 and the fastening screws 33 down to the prongs of the tip 30 thus heating up the heating element of the tip 29. A 2.2-2.5 volt and 8-8.4 ampere (20 Watt) DC power supply must be electrically connected to the power cord 27 to turn the iron on. This power supply can be a standard wall transformer, many of which are far to common in industry to warrant any further discussion of their design. Also note that it is envisaged that common commercial rechargeable power supply configurations can also provide the needed power characteristics thus giving possibility to a portable fingertip soldering iron. One compatible possibility for the tip 28 as mentioned earlier is also already manufactured by Wahlclipper, and it draws about 20W.

Let it be appreciated that using the fasting screws 33 as a connecting means for the prongs of the tip 30 is only one possible connecting method out of many possibly embodiments. For example, it is envisaged that a miniature spring connector, many of which are well known to someone skilled in the connector arts, can be inserted within the prong holders 32. These can be dual-sided connectors allowing the prongs of the tip 30 to plug in from the front and allowing power prongs (not shown) to either be plugged in or soldered permanently towards the back end of the cylinder 11. Again, still other tip 28 fastening means can be appreciated because connecting the tip to the cylinder 11 is not particularly an object of the invention.

Once the tip 28 is fastened securely into the prong holders 32, the tip 28 is then suspended within the hollow tubular portion 12 of the cylinder 11. The tip 28 is then suspended leaving a small air gap (0.05"-0.1") between the hollow tubular portion 12 and the tip 28 itself. This gap needs to be provided as a means of thermal insulation from the material since the temperature of the tip 28 reaches upwards in the vicinity of 700 F-800 F.

The most inward layer of the hollow tubular portion 12 is the thermal insulator insert 22 which is there to protect the next layer of material, the thermoplastic layer 21. It is possible, that if enough force is applied to the tip 28 when in use, that the prongs of the tip 30 may elastically bend outward thus touching the cylinder 11. Therefore, the thermal insulator insert 22 (Melting Point >800 F) exists to keep the thermoplastic layer 21 from melting. The thermoplastic layer 21 is preferably made from a thermoplastic with a melting point after injection of 400 F-650 F. Note, most materials of melting points greater than 600 F are costly and difficult to inject. Let it be envisaged though, that if a thermoplastic of melting point (after injection) of greater than 750 F is used for the thermoplastic layer 21 then the thermal insulator insert 22 can be eliminated altogether from the design. Needless, to say though, because of current high material costs and injection difficulties for those types of thermoplastics, this is not currently the preferred embodiment. Keep in mind though that technological advances in the materials sciences may will most likely give rise to a cheaper and better thermoplastics in the future that could preclude the use of a thermal insulator insert 22 in the future. A final top layer of foam insulation 20 is further added to the cylinder 11 so as to keep this outer layer cooler than 100 F in temperature. In the preferred embodiment in FIGS. 1 and 2, the aforesaid three layers of design: the thermal insulator insert 22, the thermoplastic layer 21, and the foam insulation 20, altogether provide a functional heat dissipation design constructed for the worst case scenario of the prongs 30 bending during operation and allowing the heating element of the tip 2 to touch the thermal insulator insert 22 which is the innermost layer of the hollow tubular portion 12. Heat ventilation slots 13 aid in the transfer of heat away from the cylinder 11. Let it be appreciated that any other heat dissipation techniques could be used besides the layering of different materials. Furthermore, let it be appreciated that the hollow tubular portion 12, in certain cases, can be left out, although this is not the preferred embodiment because the hollow tubular portion 12 serves as a protective cover from the tip of the finger and the surrounding environment. It is further envisaged that the cylinder 11 could possibly be completely manufactured out of a low heat conducting ceramic (such as Alumina A-410 with Thermal conductivity of 1.7 W/m * K), although this currently isn't preferred because of the high cost of manufacturing. When the prices of ceramic injection molding procedures and forming drop significantly in the future, it will be the preferred embodiment to construct the cylinder 11 out of ceramic thereby possibly eliminating much of the current layering scheme. Again, the manner and nature in which many of the materials construe the cylinder 11 is not particularly important to the invention. The scope of the invention appreciates any means of dissipating the heat from the tip 28 away from the cylinder 11.

The adjustable fingerstrap 15 is the means, in the preferred embodiment, of securing the finger to the fingertip soldering iron body. The attached end of the strap 16 is permanently wound around and sewed (or glued) to the right rim 23. The free end of the strap 16.5 is unattached to provide for adjustability. The free end of the strap 16.5 then goes up through the bottom of the base 14 and around the opening in the left rim 24 and then folds downward attaching to itself by means of a male securing means 25 and a female securing means 26. The male securing means 25 and the female securing means 26 can simply be Velcro loops and hooks which are standard on all Velcro products. These hooks and loops would both be on the bottom side of the fingerstrap 15. This wrap-around effect which secures around the finger is not uncommon. It has been seen in such products as Velcro shoes and watches so will not be discussed in much more detail. The male and female securing means 25 & 26 on the fingerstrap 15 are made long enough to provide some adjustability of different size fingers. Let it be appreciated that any means of securing the finger to the fingertip soldering iron body will do. For example, it is envisaged that although a fingerstrap is the preferred embodiment, a thimble for the finger (not shown) is another possibility. Furthermore, if an strap is used, it does not need to be adjustable, although, needless to say, this is preferred.

We claim:
1. A fingertip soldering iron comprising:
   a) A finger attachment means
   b) A fingertip soldering body which is secured to the said finger attachment means which sits above or in front of a human finger whereby freeing up the rest of that same hand to hold wires, solder, and/or other equipment while soldering.
   c) A connecting means within the said fingertip soldering body which attaches a heating element means firmly to the said fingertip soldering body.

2. The fingertip soldering iron as claimed in claim 1 wherein the said soldering body contains a protective cover around at least 40 percent of the length of the said heating element means.

3. The fingertip soldering iron as claimed in claim 2 wherein the said soldering body also contains another base structure that allows the said protective cover to slide up and down the finger for adjustability.

4. The fingertip soldering iron as claimed in claim 3 wherein the said base structure contains a safety notch so that the said protective cover cannot slide forward off of the said base structure.

5. The fingertip soldering iron as claimed in claim 2 wherein the said protective cover is a cylinder having three layers of material; the innermost material being of a ceramic derivative, the center layer being a thermoplastic of melting point 400 F–650 F, and the outermost layer being of a foam derivative with melting point greater than 150 F.

6. The fingertip soldering iron as claimed in claim 2 wherein the said protective cover is made out of a ceramic.

7. The fingertip soldering iron as claimed in claim 2 wherein the said protective cover is a cylinder with heat ventilation slots cut in it for heat dissipation.

8. The fingertip soldering iron as claimed in claim 5 wherein the center layer is made of stanyl.

9. The fingertip soldering iron as claimed in claim 2 whereby the said heating element has heating prongs that can be connected by some connecting means into the back of the said fingertip soldering body, hence supporting the said heating element means firmly so that the said heating element means is suspended within the said protective cover with only the said heating prongs of the said heating element touching the said fingertip soldering body.

10. The fingertip soldering iron as claimed in claim 1 wherein the said finger attachment means is a strap made of fabric.

11. The fingertip soldering iron as claimed in claim 10 whereby the said strap is adjustable.

* * * * *